United States Patent Office 3,801,577
Patented Apr. 2, 1974

3,801,577
PHOSPHORIC AND THIOPHOSPHORIC ACID
DERIVATIVES OF QUINOXALINE
Hans Helfenberger, Reinach, Basel-Land, and Karl Lutz, Basel, Switzerland, assignors to Sandoz Ltd., Basel, Switzerland
No Drawing. Filed Aug. 16, 1966, Ser. No. 572,660
Claims priority, application Switzerland, Sept. 3, 1965, 12,337/65
Int. Cl. C07d 51/78
U.S. Cl. 260—250 R      5 Claims

ABSTRACT OF THE DISCLOSURE

Phosphoric and thiophosphoric acid ester and amide derivatives of quinoxaline useful as insecticides, acaricides and nematocides.

The present invention relates to new insecticidal, acaricidal and nematocidal phosphoric and thiophosphoric acid esters and amides and to a process for their production.

The present invention provides compounds of the Formula I

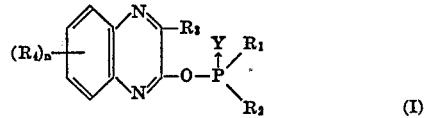

(I)

wherein
each of $R_1$ and $R_2$ represents —O— (alkyl $C_1$ to $C_4$) or —N(alkyl $C_1$ to $C_4$)$_2$,
$R_3$ represents —H, —CH$_3$, —OH or —COO— (alkyl $C_1$ to $C_4$),
$R_4$ represents —CH$_3$, a halogen atom, —NO$_2$ or —H,
Y represents S or O and
n represents a whole number from 1 to 4 inclusive.

The compounds of Formula I may be obtained by reacting a compound of the Formula II

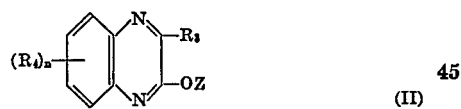

(II)

with a compound of the Formula III

(III)

whereby in Formulae II and III $R_1$, $R_2$, $R_3$, $R_4$, Y and n have the above significance,
X represents a halogen atom and
Z represents a cation,
with the proviso that when Z represents a hydrogen atom the reaction is effected in the presence of an acid binding agent. Examples of suitable cations are sodium, potassium, calcium and H$^+$N(C$_2$H$_5$)$_3$. Suitable acid binding agents are, e.g., sodium hydroxide, triethylamine and sodium carbonate.

Suitably the reaction is effected in an organic solvent, for example methylisobutyl ketone, at an elevated temperature, especially at 30–80° C.

Suitable compounds of the Formula II are, for example, 2-hydroxy-quinoxaline, 2,3-dihydroxy-quinoxaline, 2-hydroxy-3-methyl-quinoxaline, 2 - hydroxy-3-ethoxycarbonyl-quinoxaline, 2-hydroxy-6(or 7)-chloro - quinoxaline, 2-hydroxy-6(or 7)-nitro-quinoxaline, 2-hydroxy-6, 7-dimethyl-quinoxaline, 2-hydroxy-3-methyl-6(or 7)-nitro-quinoxaline, 2-hydroxy-3,6(or 7)-dimethyl-quinoxaline. Many of the compounds of Formula II are known (c.f. for example Bull. Soc. Chim. 1963, 356; J. Chem. Soc. 1945 622; J. Am. Chem. Soc. 76, 4483 (1954); J. Chem. Soc. 1964, 4056); the hitherto unknown ones can easily be produced by methods analogous to the ones described in the said literature references.

Examples of suitable compounds of the Formula II are:

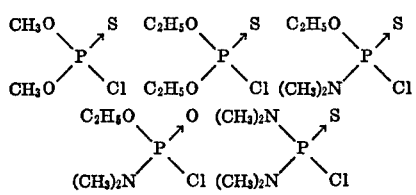

The compounds of Formula I, depending on their constitution, are crystalline solids or oils some of which oils can be distilled in the high vacuum of an oil diffusion pump; they are insoluble in water, capable of being kept in aqueous suspension and soluble in most organic solvents except petroleum ether.

The compounds of Formula I are very suitable for protecting plants from insects, spider mites and nematodes; they have a relatively low toxicity towards warm-blooded animals and humans.

The compounds of Formula I are substantially less toxic towards warm-blooded animals, while having a markedly superior insecticidal effect, than the compounds of the Formula IV

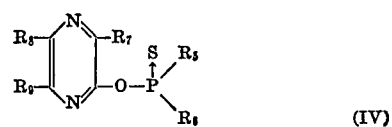

(IV)

in which $R_5$ and $R_6$ represent —O— (low alkyl), —NH— (low alkyl) or —N (low alkyl)$_2$ and
$R_7$, $R_8$ and $R_9$ represent H, halogen, low alkyl or phenyl, which have been described in U.K. patent specification No. 948,522 and No. 867,441. This advantage is of great importance as it enables the compounds of Formula I to be used for protecting plants with a minimum of danger to humans and highly developed animals. The superiority of the Compounds I over the Compounds IV is illustrated by the test results shown in Table 1.

TABLE 1

| Compound | | Toxicity to ♂ white rats LD₅₀ (oral, acute), mg./kg. | Toxicity to *Musca domestica* LT₅₀, minutes |
|---|---|---|---|
| [pyrazine structure with S, OC₂H₅, OC₂H₅] | (Described in U.K. Patent Specification No. 867,441.) | 11.5 | 50 |
| [pyrazine structure with S, OCH₃, OCH₃] | | 16 | 70 |
| [quinoxaline with S, OC₂H₅, OC₂H₅] | (Example 1 hereof) | 25.7 | 45 |
| [quinoxaline with S, OCH₃, OCH₃] | (Example 2 hereof) | 1,260 | 40 |
| [Cl-quinoxaline with S, OC₂H₅, OC₂H₅] | (Example 6 hereof) | 700 | |
| [dimethyl-quinoxaline with S, OC₂H₅, OC₂H₅] | (Example 7 hereof) | 430 | |
| [quinoxaline with S, OC₂H₅, N(CH₃)₂] | (Example 8 hereof) | 150 | |
| [quinoxaline with S, N(CH₃)₂, N(CH₃)₂] | (Example 10 hereof) | 142 | |

Note.—The term "LT₅₀" means the time (in minutes) during which 50% of the animals are killed off with an amount of 0.05% by weight of active agent.

The outstanding suitability of the new compounds of the Formula I for combating noxious insects in agriculture may be seen from the test results given in Table 3. The figures quoted were determined as follows:

The active agents are made up in the form of 25% emulsion concentrates or 25% wettable powders for testing insecticidal/acaricidal effect.

Preparation in the form of an emulsion concentrate (for oils and low melting point solid active materials)

| | Percent |
|---|---|
| Active agent | 25 |
| Isooctylphenyldecaglycol ether | 25 |
| Acetone | 50 |

Preparation in the form of a wettable powder (for crystalline active agents having a melting point above 65° C.):

25% active agent
7.8% of soybean-albumen extract
2.6% of dextrin
9.4% of the sodium salt of dinaphthylmethanedisulphonic acid (98%)
1.0% of ammonium caseinate
2.1% of the sodium salt of dodecylbenzenesulphonic acid (technical, 75%)
52.1% of diatomaceous earth.

The above two preparations are dispersed in water by stirring to give (i) a 0.05% and (ii) a 0.0125% emulsion or suspension ready for spraying. In all the following tests liquors of concentration (i) and (ii) were used and the results are shown in Table 3.

(A) TEST FOR INSECTICIDAL CONTACT EFFECT (aa) Contact effect of dry covering

Insect: *Bruchidius obtectus* imagines.—By means of a spraying nozzle 0.1–0.2 ml. of test liquor per dish was sprayed onto 7 cm. Petri-dishes. After drying the layer of active agent sprayed on the dishes for about 4 hours, 10 Bruchidius imagines are placed in each dish and the latter covered with a lid of a fine mesh brass wire screen. The animals are kept at room temperature without food for 48 hours and the dead animals are then counted. Mortality is given as a percentage.

(ab) Contact effect by direct spraying

Insect: *Anagesta (Ephestia) kuehniella*, caterpillars. On the day before treatment 10 caterpillars each of 10–12 mm. length are counted into 7 cm. Petri-dishes and kept without food until treatment. They are then directly sprayed in the open dishes by means of a spraying nozzle in such a way that the test liquor quantity per dish amounts to 0.1–0.2 ml. The dishes are covered with the above described screen lids. After drying the covering a wafer is given as food and renewed as required. After 5 days the dead animals are counted. The mortality is stated as a percentage.

(ac) Contact effect against *Aphis fabae*

Black beans about 10 cm. in length are infected in a breeding cage 2 days before treatment with 800–1200 aphides per test plant (mixed population). The infected plants are cut off and immediately immersed for 3 seconds into moderately stirred test liquor. The stem is then stuck into a culture flask (5 cm. diameter) and the liquor is allowed to drip off. After the liquor has dried the plant is put into an almost horizontal position above a glass plate 20 x 20 cm. After 2 days the quantity of exuded honey dew is appraised (0=no exudation, 5=very strong exudation). These appraisement indices are transformed into an effect percentage, due allowance being made for untreated controls. Results are expressed as an effect percentage.

(B) FEED EFFECT OF DRY COVERING ON TRADESKANTIA LEAVES

Insect: *Carausius morosus*

A cut Tradeskantia branch is immersed for 3 seconds in moderately stirred test liquor. The stem is then thrust through a small glass tube with water and placed into a glass dish of 14 cm. diameter. 10 carausius larvae II are counted out, the dish closed with a screen lid and after 5 days the dead and paralyzed animals counted out. The mortality is expressed as a percentage.

(C) ACARICIDAL EFFECT TEST

Contact effect on *Tetranychus telarius*

1 day before treatment a cork borer is used to cut out roundels of 2 cm. diameter from bean leaves containing 20–30 mites (larvae III and adults). Up to the treatment the roundels are kept in a Petri-dish on a moistened filter paper, then treated for 3 seconds by immersion into moderately stirred test liquor and replaced in the Petri-dish. Subsequently filter paper in the Petri-dish is freshly moistened and the Petri-dish lid replaced in an askew position so that quick drying on slight aeration is avoided. After 48 hours at room temperature the live and dead mites are counted out under a binocular magnifying glass (10 times). Mortality is expressed as a percentage. The production of the compounds of Formula I is illustrated by the following examples.

EXAMPLE 1

29.2 g. of 2-hydroxy-quinoxaline are suspended in 200 ml. of methanol, a solution of 4.6 g. of sodium in 100 ml. of methanol is added and the resulting solution is evaporated to dryness in a vacuum. The resulting sodium salt (34 g.) is suspended in 700 ml. of methylisobutyl ketone and then 39.3 g. of O,O-diethylthionophosphoryl chloride are added to the suspension while stirring. The reaction mixture is subsequently heated to 60° C. and stirred at this temperature for 15 hours. Cooling is effected, filtering, the filtrate is washed with 3 portions of 100 ml. of water each, dried with Glauber salt and evaporation is effected. The oily residue (53 g.) is taken up in 150 ml. of xylene, the solution is filtered free of undissolved material and shaken with ice cold N sodium hydroxide solution and washed neutral with water. After drying over Glauber salt, the solution is evaporated; 44 g. of brown oil results which boils at 142° C. in a vacuum of $3 \times 10^{-4}$ mm. of Hg. Yield: 74%. The properties are listed in Table 2.

EXAMPLE 2

73 g. of 2-hydroxy-quinoxaline are suspended in 500 ml. of methanol, a solution of 11.5 g. of sodium in 250 ml. of methanol is added and the resulting solution is evaporated completely to dryness. The dry sodium salt is suspended in 1.7 litres of methylisobutyl ketone and then 84 g. of O,O-dimethylthionophosphoryl chloride are added. The mixture is heated to 60° C. and kept for 8 hours at this temperature whilst stirring. Cooling is effected, washing with 3 portions of 250 ml. of water is carried out, drying with Glauber salt is effected followed by evaporation. The oily residue is taken up in 400 ml. of xylene, undissolved material is filtered off, the solution is washed with ice cold N sodium hydroxide solution and then with water until neutral. After drying and evaporation 70 g. of a dark oil remain. Yield: 52%. Purification is effected by chromatography on neutral aluminium oxide followed by crystallization from ether/petroleum ether. The properties are listed in Table 2.

EXAMPLE 3

32.4 g. of 2,3-dihydroxy-quinoxaline (melting point 378° C.) (0.2 mol) are converted to the sodium salt with 4.6 g. of sodium in methanol as described in Example 1. The dry sodium salt is suspended in 600 ml. of methylisobutyl ketone, 39.3 g. of O,O-diethylthiophosphoryl chloride are added and the mixture heated to 60° C. and stirred for 48 hours. Working up is effected as in Example 1 and 17 g. of a brown oil is obtained which may be purified by chromatography on neutral aluminium oxide. The properties are listed in Table 2.

EXAMPLE 4

32 g. (0.2 mol) of 2-hydroxy-3-methyl-quinoxaline (melting point 250° C.) are converted to the sodium salt as described in Example 1. The dried sodium salt is stirred with 600 ml. of methylisobutyl ketone and 39.3 g. of O,O-diethylthiophosphoryl chloride for 17½ hours at 60° C. and the reaction mixture is worked up as described in Example 1. The thionophosphate is obtained in the form of a brown oil (36.1 g.) and this material is purified by distillation in a vacuum at the oil diffusion pump. The properties are listed in Table 2.

EXAMPLE 5

The procedure is as in Example 1 except that, instead of using 2-hydroxy-quinoxaline, 43.6 g. of 2-hydroxy-3-ethoxy-carbonyl-quinoxaline (0.2 mol) (melting point 175° C.) are used and 35 g. of a brown oil result which forms colorless crystals after purification on neutral aluminium oxide. The properties are listed in Table 2.

EXAMPLE 6

The procedure is as in Example 1 except that, instead of 2-hydroxy-quinoxaline, 36.2 g. (0.2 mol) of 2-hydroxy-6(or 7)-chloro-quinoxaline (melting point 216–220° C.) are used and 35.4 g. of a crystalline active material is obtained which melts at 67° C. after recrystallization from ether/petroleum ether. The properties are listed in Table 2.

EXAMPLE 7

The procedure is as in Example 1 except that, instead of 2-hydroxy-quinoxaline, there is used 34.8 g. (0.2 mol) of 2-hydroxy-6,7-dimethyl-quinoxaline (melting point 302° C.) and 40.2 g. of a dark oil is obtained which crystallizes in analysis pure form from ether/petroleum ether after purification on neutral aluminium oxide. The properties are listed in Table 2.

EXAMPLE 8

34 g. of the dry sodium salt of 2-hydroxy-quinoxaline are suspended in 500 ml. of acetonitrile. 40 g. of O-ethyl-N,N-dimethyl-thiophosphoric acid amide chloride are added dropwise and the mixture is subsequently stirred for 21 hours at a temperature of 60° C. The cooled reaction mixture is filtered, the filtrate evaporated in a vacuum and the residue taken up in 500 ml. of xylene. After filtering off insoluble portions, the xylene solution is shaken with ice cold N sodium hydroxide solution and then with water until neutral and evaporated after drying with Glauber salt. 42 g. of an oil remain which is obtained in analysis pure form by distillation in a high vacuum. The properties are listed in Table 2.

EXAMPLE 9

13.8 g. of the dry sodium salt of 2-hydroxy-quinoxaline are suspended in 150 ml. of methylisobutyl ketone. 14 g. of O-ethyl-N,N-dimethyl-phosphoric acid amide chloride are added dropwise and the mixture is stirred for 20 hours at 60° C. Working up is effected as described in Example 1. 11.8 g. of a brown oil are obtained which is purified to give the analysis pure form by chromatography on neutral aluminium oxide. The properties are listed in Table 2.

EXAMPLE 10

25.7 g. of the dry sodium salt of 2-hydroxy-quinoxaline are mixed with 150 ml. of dimethylformamide and 31 g. of bis-dimethylamido-thionophosphoric acid chloride are added dropwise thereafter. The reaction mixture is then stirred for 42 hours at 60° C. and then for a further 8 hours at 80° C. After cooling and filtering off a pasty precipitate, the dimethylformamide is distilled off at reduced pressure. The remaining residue is taken up in 500 ml. of xylene. Insoluble material is filtered off, the xylene solution is washed with 0.5 N sodium hydroxide solution, then with water until neutral, dried and evaporated. The resulting dark oil (24.1 g.) soon solidifies. After recrystallization from ether/petroleum ether the material is analysis pure. The properties are listed in Table 2.

EXAMPLE 11

The procedure is as in Example 2 except that, instead of 2-hydroxy-quinoxaline, there is used 91 g. of 2-hydroxy-6(or 7)-chloro-quinoxaline (melting point 216–220° C.), and 65 g. of brown crystals are obtained which are made analysis pure by recrystallization from ether/petroleum ether. The properties are listed in Table 2.

EXAMPLE 12

The procedure is as in Example 2 except that, instead of 2-hydroxy-quinoxaline, there is used 80 g. of 2-hydroxy-3-methyl-quinoxaline (melting point 250° C.) and 41 g. of a dark oil is obtained. The properties are listed in Table 2.

TABLE 2.—PROPERTIES OF THE COMPOUNDS OF FORMULA I

| | Compound | | | | | | Analysis (percent) | | | | | |
|---|---|---|---|---|---|---|---|---|---|---|---|---|
| | | | | | | | Calculated | | | Found | | |
| Ex. | $R_1$ | $R_2$ | $R_3$ | $(R_4)_n$ | Y | Properties | C | N | P | C | N | P |
| 1 | OEt | OEt | H | H | S | Light oil, $n_D^{20}$ 1.5710 B.P. 142° C./3·10$^{-4}$ mm. of Hg. M.P. 31° C. | 48.3 | 9.4 | 10.4 | 48.2 | 8.5 | 9.7 |
| 2 | OCH$_3$ | OCH$_3$ | H | H | S | Light crystals, M.P. 50–1° C | 44.5 | 10.4 | 11.5 | 44.9 | 9.9 | 11.6 |
| 3 | OEt | OEt | OH | H | S | Light oil | | | 9.9 | | | 9.5 |
| 4 | OEt | OEt | CH$_3$ | H | S | Light oil, B.P. 110° C./3·10$^{-4}$ mm. of Hg. | 50.0 | 9.0 | 9.9 | 50.0 | 8.7 | 9.2 |
| 5 | OEt | OEt | COOEt | H | S | Light needles, M.P. 43–4° C | 48.6 | 7.6 | 8.4 | 48.6 | 7.2 | 8.1 |
| 6 | OEt | OEt | H | Cl(6/7)* | S | Light crystals, M.P. 66–7° C | | 8.4 | 9.3 | | 8.3 | 8.8 |
| 7 | OEt | OEt | H | (CH$_3$)$_2$** | S | Light crystals, M.P. 44–5° C | 51.5 | 8.6 | 9.5 | 51.6 | 8.1 | 9.1 |
| 8 | OEt | N(CH$_3$)$_2$ | H | H | S | Yellow oil, B.P. 106° C./3·10$^{-4}$ mm. of Hg. | 48.4 | 14.1 | 10.4 | 47.7 | 13.5 | 9.8 |
| 9 | OEt | N(CH$_3$)$_2$ | H | H | O | Yellow oil | 51.2 | 15.0 | 11.0 | 51.0 | 15.2 | 9.2 |
| 10 | N(CH$_3$)$_2$ | N(CH$_3$)$_2$ | H | H | S | Light needles, M.P. 77–8° C | 48.6 | 18.9 | 10.5 | 48.7 | 18.6 | 10.8 |
| 11 | OCH$_3$ | OCH$_3$ | H | Cl(6/7)* | S | Light crystals, M.P. 100° C | 39.4 | 9.2 | 10.2 | 40.9 | 9.6 | 9.7 |
| 12 | OCH$_3$ | OCH$_3$ | CH$_3$ | H | S | Brown oil | | | | | | |

*Cl in 6- or 7-positions.
**One CH$_3$ each in 6- and 7-position.

TABLE 3.—INSECTICIDAL/ACARICIDAL EFFECT OF THE (THIO)PHOSPHORIC ACID ESTERS OR AMIDES

| Compound according to Example— | Concentration percentage of active agent | Bruchidius obtectus contact effect percent after 2 days | Ephestit caterpillar contact effect percent after 5 days | Aphid contact effect percent after 2 days | Carausius feed effect percent after 5 days | Tetranychus acaricidal effect percent after 2 days |
|---|---|---|---|---|---|---|
| 1 [1] | 0.05 | 100 | 100 | 100 | 100 | 100 |
| | 0.0125 | 100 | | 100 | 100 | 100 |
| 2 [1] | 0.05 | 100 | 90 | 100 | 100 | 100 |
| | 0.0125 | 100 | | 95 | 100 | 100 |
| 3 [1] | 0.05 | 100 | 100 | 100 | 100 | 100 |
| | 0.0125 | 100 | | 95 | 100 | 95 |
| 4 [1] | 0.05 | 100 | | | 100 | |
| | 0.0125 | | | | 90 | |
| 5 [1] | 0.05 | 100 | | | | |
| 6 [2] | 0.05 | 100 | | 95 | | |
| | 0.0125 | 100 | | 95 | | |
| 7 [1] | 0.05 | 100 | | | | |
| | 0.0125 | | | 95 | | |
| 8 [1] | 0.05 | 100 | | 80 | 100 | |
| 9 [1] | 0.05 | | | 95 | 100 | |
| | 0.0125 | | | 80 | 90 | |
| 10 [2] | 0.05 | | | 100 | 100 | |
| | 0.0125 | | | | 90 | |
| 11 [1] | 0.05 | 100 | | | | |
| 12 [1] | 0.05 | 100 | | 95 | 100 | 100 |
| | 0.0125 | 90 | | 80 | 100 | |

[1] In the form of a 25% emulsion concentrate, produced according to the procedures given after Table 1.
[2] In the form of a 25% wettable powder, produced according to the procedures given after Table 1.

The compounds according to the invention may be used for pest combating in accordance with the methods usual in plant protection; they may be presented, for example, in the form of highly concentrated solutions, emulsions, suspensions, wettable powders, sprays, dusting agents or granulates. For this purpose they may be mixed in manner known per se with inert carriers, solvents, emulsifiers, dispersing agents or, if desired, with further additives, e.g. stabilizers or other pest combating agents, thus forming pest combating compositions which are also included within the scope of the present invention.

We claim:
1. The compound having the formula:

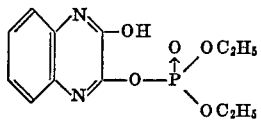

2. The compound having the formula:

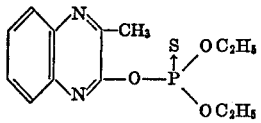

3. The compound having the formula:

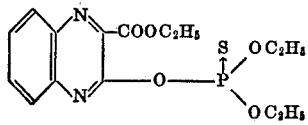

4. A compound having the formula:

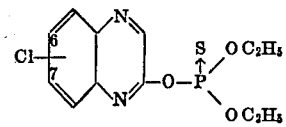

wherein the chloro atom is in the 6- or 7-position.

5. The compound of the formula:

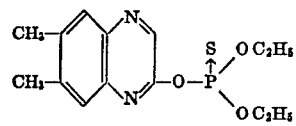

References Cited
UNITED STATES PATENTS

| | | | |
|---|---|---|---|
| 2,918,468 | 12/1959 | Dixon et al. | 260—250 |
| 3,029,237 | 4/1962 | Sasse et al. | 260—250 |
| 3,150,149 | 9/1964 | Uhlenbroek et al. | 260—310 |
| 3,172,888 | 3/1965 | Miller et al. | 260—250 |

DONALD G. DAUS, Primary Examiner

R. V. RUSH, Assistant Examiner

U.S. Cl. X.R.
442—200.